No. 615,084. Patented Nov. 29, 1898.
J. P. LYON.
JAR CLOSURE.
(Application filed Dec. 17, 1897.)
(No Model.)
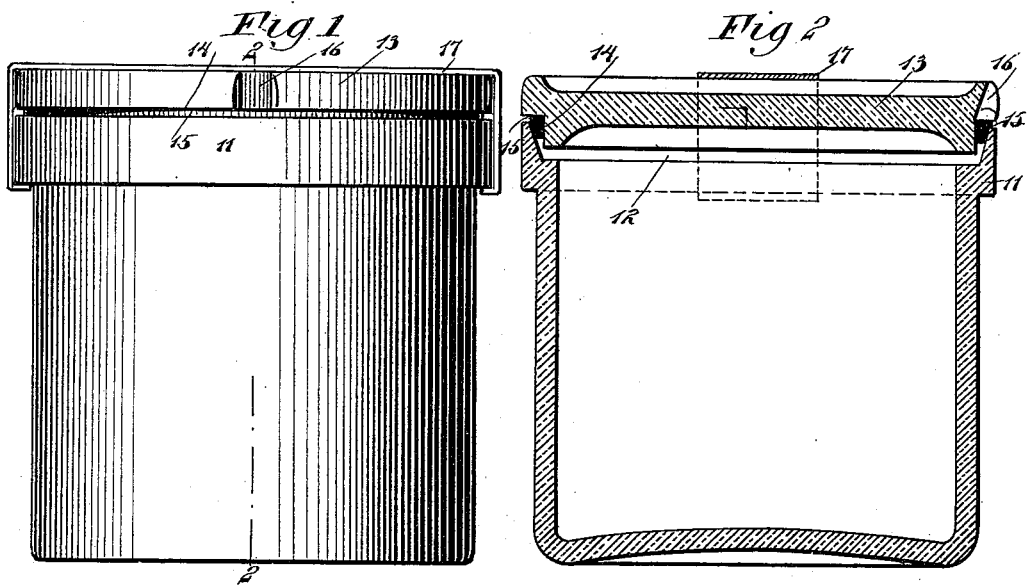

UNITED STATES PATENT OFFICE.

JULIAN P. LYON, OF DETROIT, MICHIGAN.

JAR-CLOSURE.

SPECIFICATION forming part of Letters Patent No. 615,084, dated November 29, 1898.

Application filed December 17, 1897. Serial No. 662,328. (No model.)

*To all whom it may concern:*

Be it known that I, JULIAN P. LYON, of Detroit, in the county of Wayne and State of Michigan, have invented a new and Improved Jar-Closure, of which the following is a full, clear, and exact description.

This invention is a jar-closure adapted for jars in which materials are preserved either by the aid of heat or by other means of sterilization, so that the air is exhausted from the interior of the jar and the closure held in action mainly by the pressure of the atmosphere; and the invention relates especially to a peculiar construction of the closure-cap, by which this action is made more effective.

This specification is the disclosure of one form of my invention, while the claim defines the actual scope of the invention.

Reference is to be had to the accompanying drawings, forming a part of this specification, in which similar characters of reference indicate corresponding parts in both views.

Figure 1 is a side elevation of the invention, and Fig. 2 is a section on the line 2 2 of Fig. 1.

The invention is illustrated as applied to a jar. In this form the jar has at its mouth a thickened portion 11, provided with an interior annular groove 12, the inner wall of which slants upward and outward slightly, as shown in Fig. 2. The enlarged portion 11 is regular throughout its length and its outer face is perpendicular and unbroken. The cap 13 is round to fit the mouth of the jar and is provided in its outer face, at the lower edge thereof, with an annular groove 14. This groove runs regularly around the lower edge of the cap and is formed with an inner vertical wall and a top horizontal wall. The inner wall of the groove 12 forms, therefore, in connection with the walls of the groove 14, a right-angle triangular space. In this space the gasket 15 is crowded by the downward pressure on the cap 13. The gasket is normally held in the groove 14 and moves upward with the cap when the cap is removed; but when the cap is in position, as shown in Fig. 2, the gasket is crowded into said triangular space and the closure of the jar is complete. To permit the exhausting of the air during the process of preserving the food, and also to permit of readily breaking the vacuum when it is desired to open the jar, the cap 13 is provided at one edge with a recess 16, which runs from the horizontal top wall of the groove 14 upward to the upper face of the cap and which cuts away the top wall of the groove 14 at the point of the recess. This leaves the gasket without any support at the point of the recess 16. Consequently when there is internal pressure in the jar the gasket 15 is flexed upward into the recess 16, and the gases are thus permitted to pass the gasket and escape into the atmosphere. When the exhaustion of the jar is complete, the pressure of the atmosphere crowds the gasket 15 down at all points, principally at the point of the recess 16, because the pressure is greater at this point, and by these means the vacuum is preserved. To break this vacuum preparatory to removing the cap, the gasket 15 may be pushed aside by an instrument inserted through the recess 16. When internal pressure within the jar bears against the gasket, the gasket is forced against and held by the aforesaid rib formed by the groove 14.

For temporarily holding the cap when it is not desirable or possible without a fastener to exhaust the air within the jar I provide a fastening device 17, which consists in a metallic strap run horizontally over the top of the cap and bent down at each end, so as to extend past the enlarged portion 11 of the jar. The terminals of the strap 17 are bent inward to engage beneath the enlarged portion 11, thus holding the cap rigidly in place.

Having thus described my invention, I claim as new and desire to secure by Letters Patent—

In a new article of manufacture, a jar, and a cover for the jar, one of said parts having a portion overlapping the other, and the opposed surfaces of said lapping parts forming a space tapering toward the interior of the jar, such space serving to receive a flexible gasket, one of the parts having a flange or rib presenting a shoulder at the outer edge of the tapering space, against which shoulder the gasket may bear, and the flange or rib having a notch leading outward from the tapering space to receive the adjacent portion of the gasket when the gasket is flexed against the shoulder of the rib or flange by the pressure within the jar, whereby abnormal pressure within the jar may be automatically relieved.

JULIAN P. LYON.

Witnesses:
S. P. ADAMS,
ALVA A. BENTLEY.